(12) United States Patent
Reynes et al.

(10) Patent No.: US 9,701,400 B2
(45) Date of Patent: Jul. 11, 2017

(54) AIRCRAFT COMPRISING TWO LANDING GEAR DOORS AND A MANEUVERING SYSTEM INTENDED TO MANEUVER SAID DOORS

(71) Applicant: Airbus Operations (SAS), Toulouse (FR)

(72) Inventors: Didier Reynes, Toulouse (FR); Christophe Casse, Fenouillet (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 14/699,415

(22) Filed: Apr. 29, 2015

(65) Prior Publication Data

US 2015/0307185 A1    Oct. 29, 2015

(30) Foreign Application Priority Data

Apr. 29, 2014  (FR) ...................................... 14 53877

(51) Int. Cl.
   *B64C 25/16*    (2006.01)
(52) U.S. Cl.
   CPC ................................... *B64C 25/16* (2013.01)
(58) Field of Classification Search
   CPC ............................. B64C 1/1407; B64C 26/16
   USPC .......................................... 244/129.5, 102 R
   See application file for complete search history.

(56) References Cited

U.S. PATENT DOCUMENTS

| 2,452,251 | A | 10/1948 | Martin |
| 2,538,878 | A | 1/1951 | Misulis |
| 2,604,281 | A * | 7/1952 | Werner .................... B64D 1/04 244/129.5 |
| 2,634,656 | A * | 4/1953 | Woollens ................. B64D 1/04 244/129.5 |
| 2,692,097 | A | 10/1954 | Payne |
| 4,412,665 | A | 11/1983 | Kramer et al. |
| 5,335,880 | A | 8/1994 | Klug |
| 6,352,221 | B1 * | 3/2002 | Sakurai ................... B64C 25/16 244/102 R |
| 7,338,012 | B2 * | 3/2008 | Rouyre ................... B64C 25/16 244/102 A |
| 8,267,350 | B2 * | 9/2012 | Elliott ..................... B64C 13/34 244/102 R |
| 2005/0103937 | A1 | 5/2005 | Briancourt | |

FOREIGN PATENT DOCUMENTS

| EP | 0537699 | 4/1993 |
| WO | 03089297 | 10/2003 |

OTHER PUBLICATIONS

French Search Report, Jan. 21, 2015.

* cited by examiner

*Primary Examiner* — Brian M O'Hara
*Assistant Examiner* — Keith L Dixon
(74) *Attorney, Agent, or Firm* — Greer, Burns & Crain, Ltd.

(57) ABSTRACT

An aircraft comprising a first door and a second door, each being mobile between an open position and a closed position, and a maneuvering system. The maneuvering system includes an actuation mechanism, a first transmission chain configured to transmit the movements of the actuation mechanism to the first door, a second transmission chain configured to transmit the movements of the actuation mechanism to the second door. Such a maneuvering system uses a single actuation mechanism, which results in a simplification of the mechanism and a weight saving.

7 Claims, 5 Drawing Sheets

AIRCRAFT COMPRISING TWO LANDING GEAR DOORS AND A MANEUVERING SYSTEM INTENDED TO MANEUVER SAID DOORS

CROSS-REFERENCES TO RELATED APPLICATIONS

This application claims the benefit of the French patent application No. 1453877 filed on Apr. 29, 2015, the entire disclosures of which are incorporated herein by way of reference.

BACKGROUND OF THE INVENTION

The present invention relates to an aircraft comprising two landing gear doors and a maneuvering system intended to maneuver said doors.

An aircraft conventionally comprises two main landing gears. Each main landing gear comprises a leg and a set of tires fixed to the leg. Each main landing gear is retracted into a gear cell behind a door.

During a landing, each door is opened to allow the associated main landing gear to pass and then is closed again leaving the main landing gear outside.

Each door is mounted rotationally mobile on the structure of the aircraft and is displaced by an actuation mechanism, such as a cylinder. The aircraft thus comprises two cylinders which must be controlled independently, which is relatively heavy in terms of weight and control management.

SUMMARY OF THE INVENTION

One object of the present invention is to propose an aircraft comprising two doors and a maneuvering system which does not exhibit the drawbacks of the prior art.

To this end, an aircraft is proposed comprising:
a first door and a second door, each being mobile between an open position and a closed position, and
a maneuvering system comprising:
   an actuation mechanism,
   a first transmission chain intended to transmit the movements of the actuation mechanism to the first door,
   a second transmission chain intended to transmit the movements of the actuation mechanism to the second door.

Such an aircraft is thus equipped with a single actuation mechanism which simplifies and lightens the mechanism relative to the prior art.

BRIEF DESCRIPTION OF THE DRAWINGS

The features of the invention mentioned above, and others, will become more clearly apparent on reading the following description of an exemplary embodiment, said description being made in relation to the attached drawings, among which:

FIG. 6 is a particular embodiment of the invention.

DETAILED DESCRIPTION OF THE PREFERRED EMBODIMENTS

Figure 1:
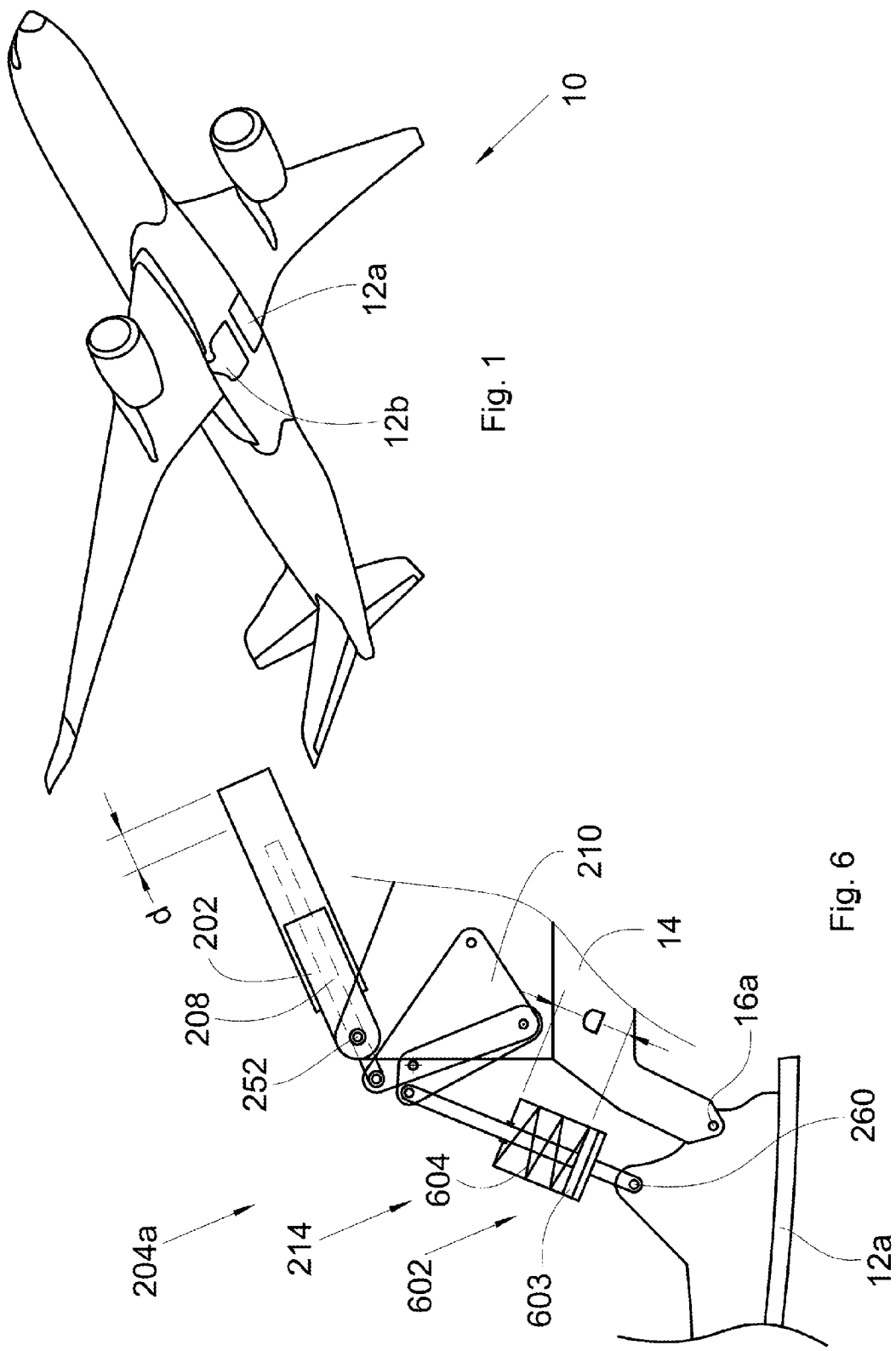
FIG. 1 shows an aircraft according to the invention with two doors.

FIG. 1 shows an aircraft 10 seen from below which comprises at least two landing gears. Each landing gear is retracted into a gear cell which is closed by a door 12a-b.

Figure 2:
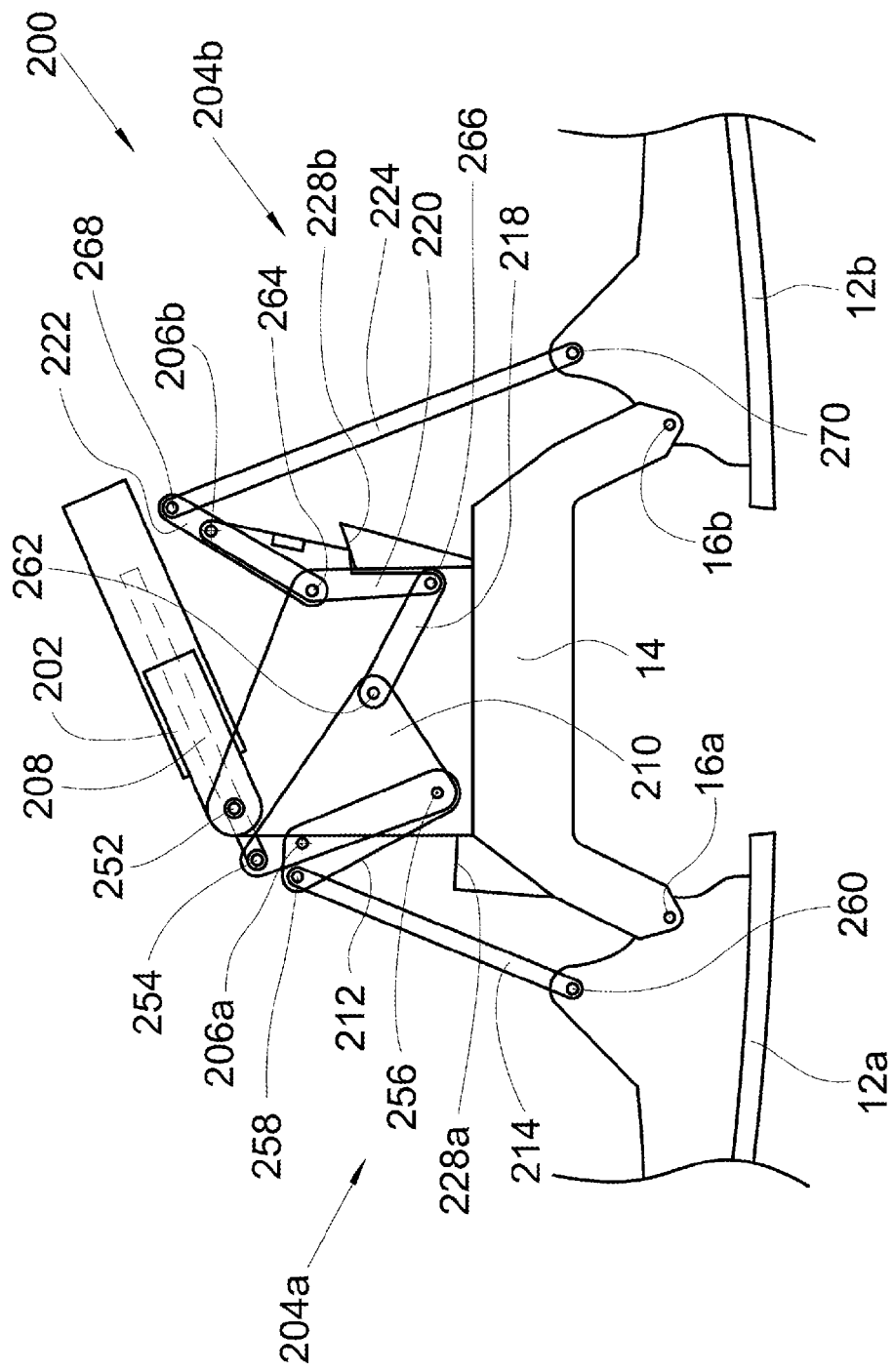
FIG. 2 shows a cross section of the aircraft along a plane at right angles to the longitudinal axis of the aircraft, when the two doors are closed.

FIG. 2 shows the two doors 12a and 12b in the closed position. The first door 12a is here the left door and the second door 12b is the right door in the direction of advance of the aircraft 10.

Each door 12a-b is mounted rotationally mobile on a structure 14 of the aircraft 10 between an open position and a closed position. To this end, the structure 14 has hinges 16a-b on each of which is mounted a door 12a-b. Each hinge 16a-b has an axis which is substantially parallel to the longitudinal axis of the aircraft 10.

FIG. 2 also shows a maneuvering system 200 which is fixed to the structure 14 of the aircraft 10 and which comprises a single actuation mechanism 202 such as a cylinder, for example. The actuation mechanism 202 has a position of closure corresponding to a closed position of the doors 12a-b and a position of opening corresponding to an open position of the doors 12a-b.

The maneuvering system 200 also comprises a first transmission chain 204a and a second transmission chain 204b.

The first transmission chain 204a is intended to transmit the movements of the actuation mechanism 202 to the first door 12a and the second transmission chain 204b is intended to transmit the movements of the actuation mechanism 202 to the second door 12b.

Such an assembly is advantageous because there is only one actuation mechanism 202, which simplifies the management of the maneuvering system, and lightens the aircraft.

Figure 3:
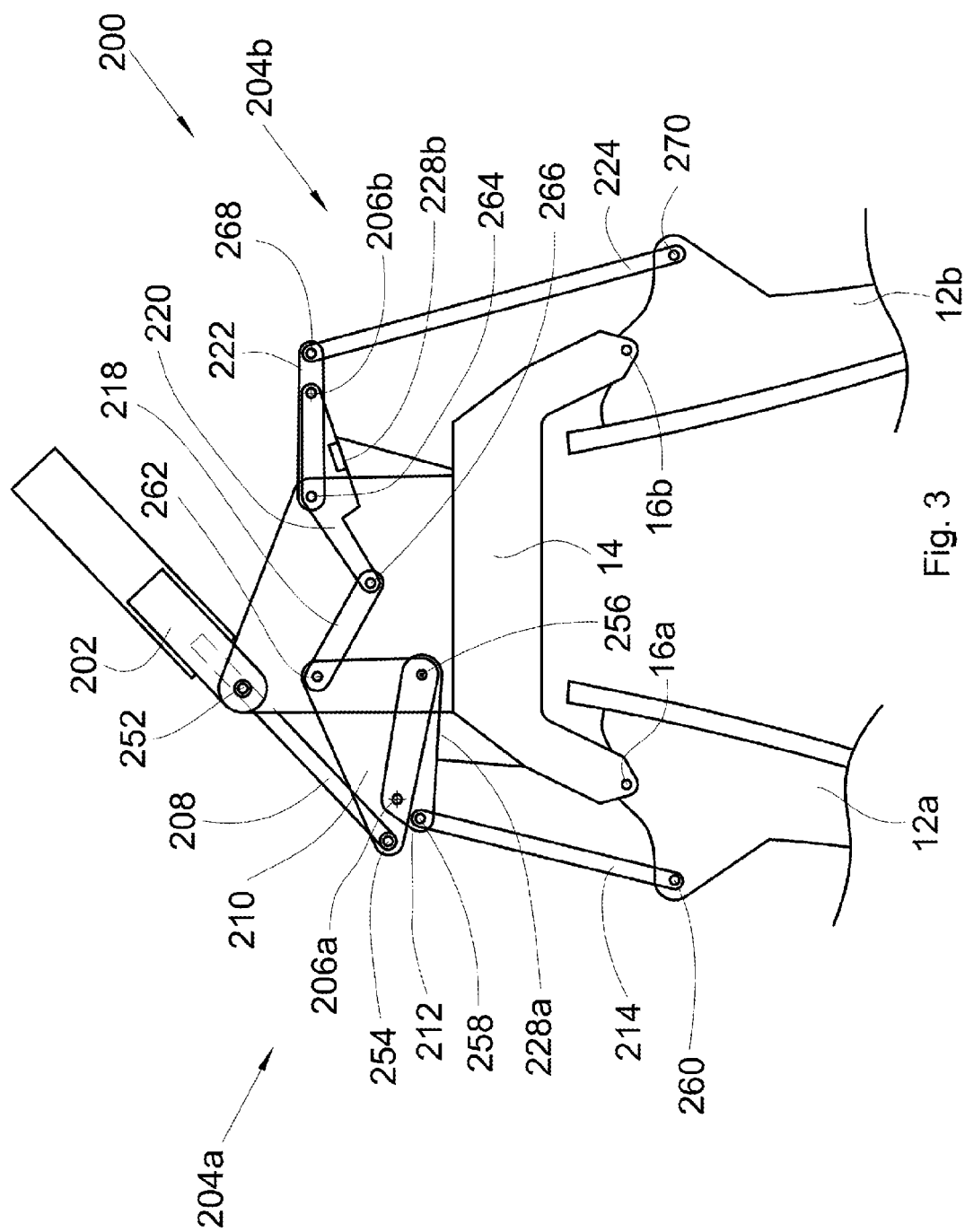
FIG. 3 is a view similar to that of FIG. 2 when the two doors are open.

FIG. 3 shows the two doors 12a and 12b in the open position and the actuation mechanism 202 in its position of opening.

For maintenance reasons, it is desirable for each door 12a-b to be able to be placed in a closed position while the other door 12b-a is in the open position.

Figure 4:
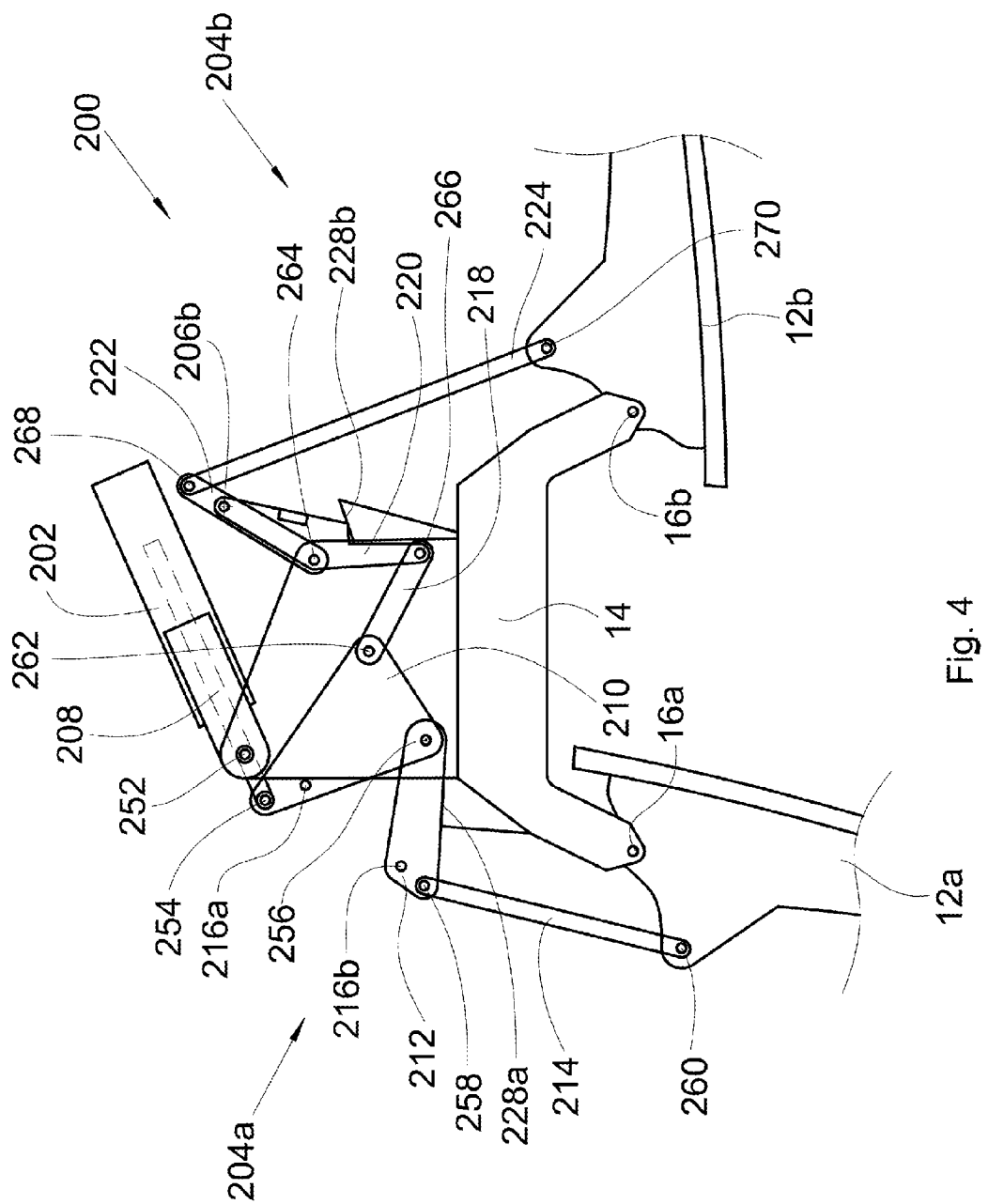
FIG. 4 and FIG. 5 are views similar to that of FIG. 2 when one door is open and the other closed.

FIG. 4 shows the maneuvering system 200 in which the first door 12a is in the open position and in which the second door 12b is in the closed position. Thus, a technician can climb along the first door 12a using at least one tread incorporated in the structure of the first door 12a and move around on the second door 12b in order to inspect the corresponding gear cell.

To this end, the maneuvering system 200 comprises a first clutch means 206a designed to alternately assume a coupling position in which the first transmission chain 204a transmits the movements of the actuation mechanism 202 to the first door 12a and a uncoupling position in which the first transmission chain 204a does not transmit the movements of the actuation mechanism 202 to the first door 12a.

Figure 5:
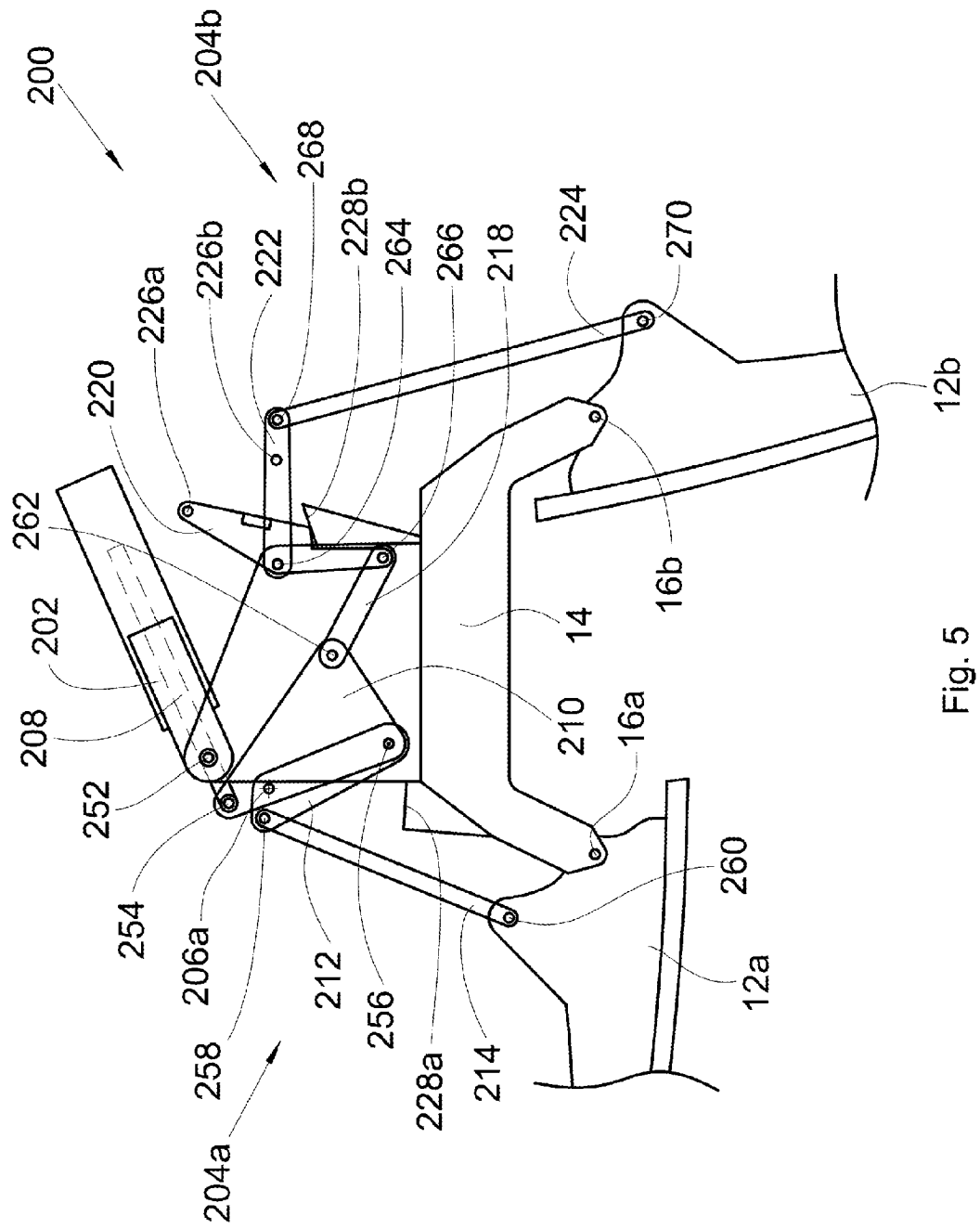

FIG. 5 shows the maneuvering system 200 in which the first door 12a is in the closed position and in which the second door 12b is in the open position. Thus, a technician can climb along the second door 12b using at least one tread incorporated in the structure of the second door 12b and move around on the first door 12a in order to inspect the corresponding gear cell.

To this end, the maneuvering system 200 comprises a second clutch means 206b designed to alternately assume a coupling position in which the second transmission chain 204b transmits the movements of the actuation mechanism 202 to the second door 12*b* and a uncoupling position in which the second transmission chain 204*b* does not transmit the movements of the actuation mechanism 202 to the second door 12*b*.

Thus, according to the position of each clutch means 206*a-b*, it is possible to independently maneuver each door 12*a-b*.

A particular embodiment of the maneuvering system 200 will now be described.

The actuation mechanism 202 comprises a cylinder mounted rotationally mobile about a first axis 252 on the structure 14. The cylinder 202 has a rod 208, the axis of which is at a right angle to the first axis 252. The first axis 252 is, here, parallel to the longitudinal axis of the aircraft 10.

The maneuvering system 200 comprises a synchronization mechanism 210 intended to synchronize the first transmission chain 204*a* and the second transmission chain 204*b*.

The maneuvering system 200 comprises a coupling mechanism 210 making it possible to mechanically link the first transmission chain 204*a* to the second transmission chain 204*b*.

The two transmission chains 204*a-b* have a common transmission element 210 intended to transmit to each transmission chain 204*a-b* the movements of the actuation mechanism 202 to the associated door 12*a-b*.

In the embodiment of the invention presented here, the synchronization mechanism 210 and the coupling mechanism 210 are one and the same element which is, here, the common transmission element 210.

The common transmission element 210 here takes the form of a common vane 210 which takes the form of a part with three articulation points and which is here of triangular form, and which is mounted rotationally mobile about a third axis 256 on the structure 14, the end of the rod 208 being mounted rotationally mobile about a second axis 254 on the vane 210.

The first transmission chain 204*a* also comprises a first arm 212 and a second arm 214.

The first arm 212 has a first end mounted rotationally mobile about the third axis 256 and a second end.

The second arm 214 has a first end mounted rotationally mobile about a fourth axis 258 on the second end of the first arm 212 and a second end mounted rotationally mobile about a fifth axis 260 on the first door 12*a*.

The second axis 254, the third axis 256, the fourth axis 258 and the fifth axis 260 are parallel to the first axis 252.

Each clutch means 206*a-b* is arranged either between the vane 210 and one of the arms (here, the first arm 212), or between two arms (here, the second arm 220 and the third arm 222).

The first clutch means 206*a* takes the form of a securing mechanism which secures the second end of the first arm 212 and the vane 210. The securing mechanism 206*a* here takes the form of a shaft which is housed in both a hole 216*a* of the vane 210 and a hole 216*b* of the second end of the first arm 212 which are designed for this purpose.

When the first clutch means 206*a* is in the coupling position, that is to say, when the shaft is in the holes 216*a-b*, and when the first door 12*a* is in the closed position (FIG. 2), the displacement of the rod 208, here the extension leads to the rocking of the vane 210 and of the first arm 212 about the third axis 256 and therefore the displacement of the second arm 214 and the opening of the first door 12*a* (FIG. 3).

Conversely, when the first door 12*a* is in the open position (FIG. 3), the displacement of the rod 208, here the retraction, leads to the rocking of the vane 210 and of the first arm 212 about the third axis 256 and therefore the displacement of the second arm 214 and the closure of the first door 12*a* (FIG. 2).

When the first door 12*a* is in the open position (FIG. 4) and the first clutch means 206*a* is in the uncoupling position, that is to say, when the shaft is not in the holes 216*a-b*, the displacement of the rod 208 leads to the rocking of the vane 210 about the third axis 256 but not that of the first arm 212, or that of the second arm 214, or that of the first door 12*a*. In this case, when the second clutch means 206*b* is in the coupling position, the second door 12*b* can be opened or closed independently of the first door 12*a*.

Conversely, when the first door 12*a* is in the open position (FIG. 4), the displacement of the rod 208, here the retraction, leads to the rocking of the vane 210 about the third axis 256 but not that of the first arm 212, or that of the second arm 214, or that of the first door 12*a*.

The second transmission chain 204*b* also comprises a first arm 218, a second arm 220, a third arm 222 and a fourth arm 224.

The first arm 218 has a first end mounted rotationally mobile about a sixth axis 262 on the vane 210 and a second end.

The second arm 220 is mounted rotationally mobile about a seventh axis 264 on the structure 14 and it has a first end mounted rotationally mobile about an eighth axis 266 on the second end of the first arm 218 and a second end.

The third arm 222 has a first end mounted rotationally mobile about the seventh axis 264 and a second end.

The fourth arm 224 has a first end mounted rotationally mobile about a ninth axis 268 on the second end of the third arm 222 and a second end mounted rotationally mobile about a tenth axis 270 on the second door 12*b*.

The sixth axis 262, the seventh axis 264, the eighth axis 268 and the tenth axis 270 are parallel to the first axis 252.

The second clutch means 206*b* takes the form of a securing mechanism which secures the second end of the second arm 220 and the third arm 222. The securing mechanism 206*b* here takes the form of a shaft which is housed in both a hole 226*a* of the second end of the second arm 220 and a hole 226*b* of the third arm 222 which are provided for this purpose.

When the second clutch means 206*b* is in the coupling position, that is to say when the shaft is in the holes 226*a-b*, and when the second door 12*b* is in the closed position (FIG. 2), the displacement of the rod 208, here the extension, leads to the rocking of the vane 210 and of the different arms 218, 220, 222 and 224 and therefore the opening of the second door 12*b* (FIG. 3).

Conversely, when the second door 12*b* is in the open position (FIG. 3 or 5), the displacement of the rod 208, here the retraction, leads to the rocking of the vane 210 and of the different arms 218, 220, 222 and 224 and therefore the closure of the second door 12*b* (FIG. 2).

When the second door 12*b* is positioned in the open position (FIG. 5) and the second clutch means 206*b* is in the uncoupling position, that is to say, when the shaft is not in the holes 226*a-b*, the displacement of the rod 208 leads to the rocking of the vane 210, of the first arm 218 and of the second arm 220, but not that of the fourth arm 222 or that of the fifth arm 224. In this case, when the first clutch means 206*a* is in the coupling position, the first door 12*a* can be opened or closed independently of the second door 12*b*.

Conversely, when the second door 12*b* is in the open position (FIG. 5), the displacement of the rod 208, here the retraction, leads to the rocking of the vane 210, of the first arm 218 and of the second arm 220, but not that of the fourth arm 222 or that of the fifth arm 224, or that of the second door 12b.

To ensure the positioning of the doors 12a-b in the open position, the structure 14 has, for each transmission chain 204a-b, an abutment 228a-b against which an element of said transmission chain 204a-b comes to bear when the door 12a-b concerned is set to the open position by the actuation mechanism 202.

In the embodiment of the invention presented here, the abutment 228a is an element of the structure 14 against which the first arm 212 of the first transmission chain 204a comes to bear.

In the embodiment of the invention presented here, the abutment 228a is an element of the structure 14 against which the second arm 220 of the second transmission chain 204b comes to bear.

The operation of the two doors 12a-b is as follows from the closed position of the two doors 12a-b (FIG. 2):

the actuation mechanism 202 is actuated to open the two doors 12a-b (FIG. 3), to ensure maintenance on the first door 12a, the second clutch means 206b is placed in the uncoupling position, in the embodiment described, the shaft is withdrawn from the holes 226a-b, the actuation mechanism 202 is actuated to close the doors 12a-b but, because of the uncoupling of the second clutch means 206b, only the first door 12a is closed (FIG. 5), so the technician can perform the maintenance, to reset the assembly, the actuation mechanism 202 is actuated to close the first door 12a, then the second clutch means 206b is replaced in the coupling position, to ensure maintenance on the second door 12b, the first clutch means 206a is placed in the uncoupling position, in the embodiment described, the shaft is withdrawn from the holes 216a-b, the actuation mechanism 202 is actuated to close the doors 12a-b but, because of the uncoupling of the first clutch means 206a, only the second door 12b is closed (FIG. 4), so the technician can then perform the maintenance, to reset the assembly, the actuation mechanism 202 is actuated to close the second door 12b, then the first clutch means 206a is replaced in the coupling position.

To ensure the closure of the doors 12a-b, each has a fixing system which fixes said door 12a-b to the structure. Each fixing system is removable to allow the door 12a-b concerned to open.

To ensure that the door which is in the closed position during the maintenance does not open accidentally, the technician locks out the fixing system of the closed door 12a-b before climbing on top.

FIG. 6 shows a detail of a particular embodiment of the first transmission chain 204a, but this embodiment applies equally to the second transmission chain 204b.

The first transmission chain 204a comprises a force limiting element 602.

Thus, when a door, for example the first door 12a, is installed, for example during assembly or adjustment operations, all the force deployed by the actuation mechanism 202 can be made to pass along a single transmission chain 204a-b and therefore deform parts if the latter are not sufficiently dimensioned for such a force. Overall, the parts will have to be dimensioned for a force twice the usual operating force (when the two clutch means 206a-b are in the coupling position and therefore the two doors 12a-b operate simultaneously).

Each force limiting element 602 is thus designed to absorb the force when the latter is greater than the usual operating force.

In the embodiment presented in FIG. 6, the second arm 214 is cut into two parts and the force limiting element 602 takes the form of a piston system coaxial with the second arm 214 and the sleeve of which is fixed to one of the parts and therefore the rod secured to the piston 603 is fixed to the other part. The piston system 602 further comprises a spring 604 which stresses the piston 603 in the bottom of the sleeve. The stiffness of the spring 604 is such that the spring 604, and therefore the piston 603, begins to be displaced only when the force applied to the piston 603 through the part to which it is fixed is greater than the normal maneuvering force.

Moreover, the travel D of the piston 603 is greater than the travel d of the actuation mechanism 202 (that is to say of the cylinder 202) at the end of kinematics, in such a way that the actuation mechanism 202 (here the cylinder 202) arrives in abutment before the force limiting system 602 (that is to say, more specifically here, the piston 603) arrives in abutment.

In the case of the second transmission chain 204b, the fourth arm 224 has the same arrangement with the associated force limiting element.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   a first door and a second door, each being mobile between an open position and a closed position about a fixed axis of a hinge, each hinge disposed on a structure of the aircraft and each door being mounted to one of the hinges, and
   a maneuvering system comprising:
      an actuation mechanism,
      a first transmission chain configured to transmit the movements of the actuation mechanism to the first door,
      a second transmission chain configured to transmit the movements of the actuation mechanism to the second door,
      a common transmission element present in the two transmission chains and configured to transmit to each transmission chain the movements of the actuation mechanism to the associated door, to link the first transmission chain to the second transmission chain and to synchronize the first transmission chain and the second transmission chain, where the actuation mechanism is a cylinder mounted to move rotationally about a first axis on a structure of the aircraft and which has a rod, where the common transmission element is a common vane mounted rotationally mobile about a third axis on the structure, the end of the rod being mounted rotationally mobile about a second axis on the vane, a first clutch configured to alternately assume a coupling position in which the first transmission chain transmits the movement of the actuation mechanism to the first door and a coupling position in which the first transmission chain does not transmit the movements of the actuation mechanism to the first door, a second clutch configured to alternately assume a coupling position in which the second transmission chain transmits the movements of the actuation mechanism to the second door and a uncoupling position in which the second transmission chain does not transmit the movements of the actuation mechanism to the second door, wherein the first transmission chain also comprises:

a first arm of the first transmission chain having a first end mounted rotationally mobile about the third axis and a second end, and a second arm of the first transmission chain having a first end mounted rotationally mobile about a fourth axis on the second end of the first arm of the first transmission chain and a second end mounted rotationally mobile about a fifth axis on the first door, and wherein the second transmission chain also comprises:

a first arm of the second transmission chain having a first end mounted rotationally mobile about a sixth axis on the vane and a second end, a second arm of the second transmission chain mounted rotationally mobile about a seventh axis on the structure and having a first end mounted rotationally mobile about an eighth axis on the second end of the first arm of the second transmission chain and a second end, a third arm of the second transmission chain having a first end mounted rotationally mobile about the seventh axis and a second end, and a fourth arm of the second transmission chain having a first end mounted rotationally mobile about a ninth axis on the second end of the third arm of the second transmission chain and a second end mounted rotationally mobile about a tenth axis on the second door.

2. The aircraft according to claim 1, wherein the first clutch and the second clutch are arranged either between the vane and one of the arms, or between two arms.

3. The aircraft according to claim 2, wherein the vane has a hole, the second end of the first arm of the first transmission chain has another hole, and the first clutch takes the form of a shaft which is housed in both said hole and said other hole in the coupling position.

4. The aircraft according to claim 2, wherein the second end of the second arm of the second transmission chain has a hole, the third arm of the second transmission chain has a hole, and the second clutch takes the form of a shaft which is housed in both said hole and said other hole in the coupling position.

5. The aircraft according to claim 1 further comprising, for each transmission chain, an abutment against which an element of said transmission chain comes to bear when the door concerned is set to the open position by the actuation mechanism.

6. The aircraft according to claim 1, wherein each door has a structure in which at least one tread is incorporated.

7. The aircraft according to claim 1, wherein each transmission chain comprises a force limiting element.

* * * * *